UNITED STATES PATENT OFFICE.

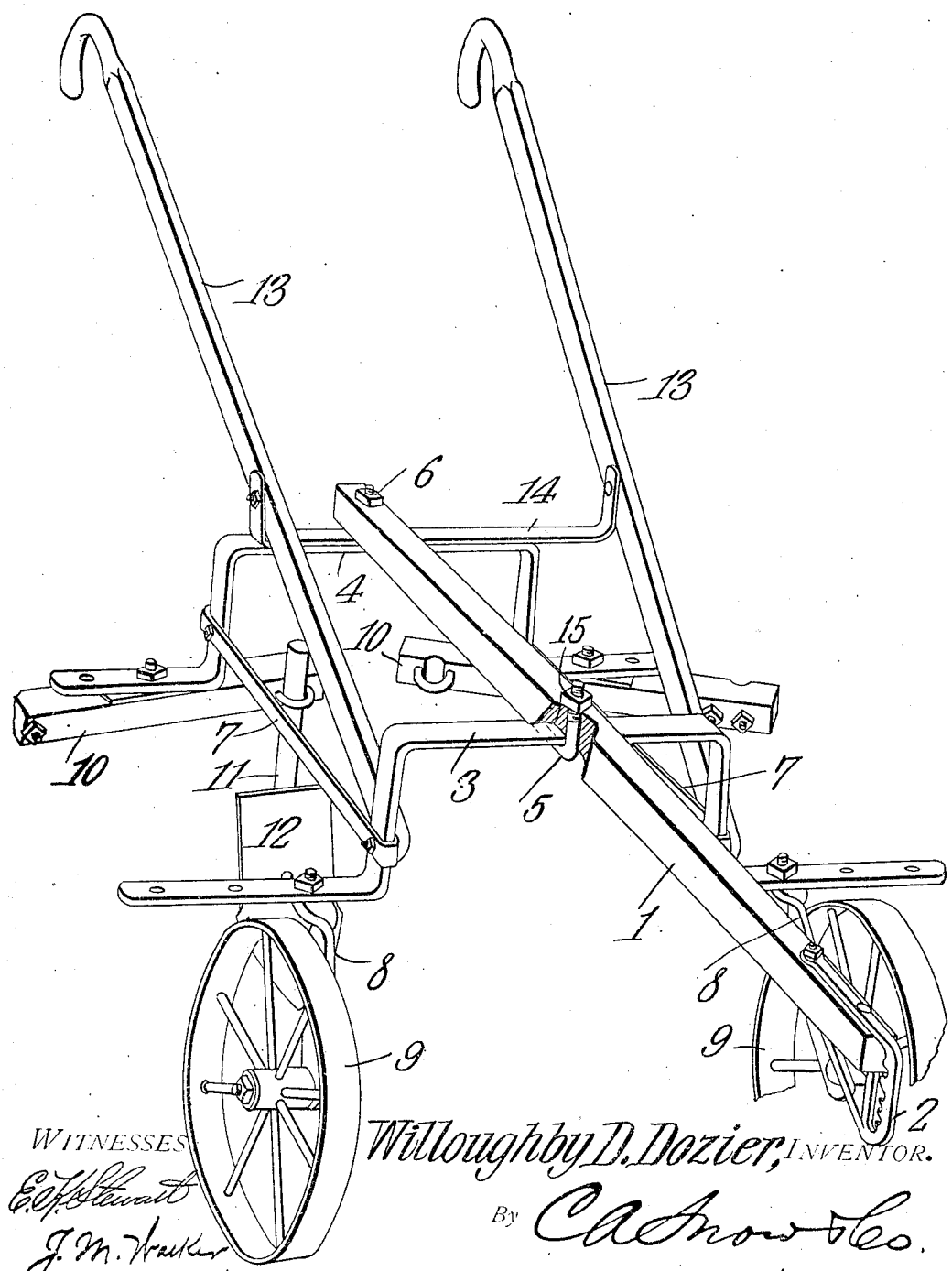

WILLOUGHBY D. DOZIER, OF WEEKSVILLE, NORTH CAROLINA.

PLOW.

No. 851,872.   Specification of Letters Patent.   Patented April 30, 1907.

Application filed February 18, 1907. Serial No. 358,072.

*To all whom it may concern:*

Be it known that I, WILLOUGHBY D. DOZIER, a citizen of the United States, residing at Weeksville, in the county of Pasquotank and State of North Carolina, have invented a new and useful Plow, of which the following is a specification.

This invention has relation to plows and it consists in the novel construction and arrangement of its parts as hereinafter shown and described.

The object of the invention is to provide a plow of simple and durable construction which may be used as a straddle row cultivator or in other capacities for tilling the soil.

The plow consists primarily of front and rear arch members with a beam connecting the same together. The beam is pivotally attached to the rear arch member and is attached to the front arch member in such manner that it may swing laterally with relation to the same. Side irons connect the vertical portions of the arch members together. The arch members are provided with horizontally disposed end portions and to the end portions of the forward arch member wheel standards are adjustably attached. Shovel bars are adjustably attached to the end portion of the rear arch member and shovel standards are attached to said bars. Plow handles are attached at their lower ends to the forward arch member and are connected together at intermediate points by a U-shaped iron which is secured to the rear arch member.

In the accompanying drawing:—the figure is a perspective view of the plow.

The plow consists of the beam 1 which is provided at its forward ends with a clevis 2. The arch members 3 and 4 are connected with the under side of the said beam 1. The beam 1 is provided with a hook or loop 5 having a nut 15 and which receives the intermediate portion of the arch member 3 and the pivot bolt 6 passes through the beam 1 and the intermediate portion of the rear arch member 4. The vertical sides of the arch members 3 and 4 are connected together by the side irons 7. The wheel standards 8 are adjustably attached to the end portions of the arch member 3 and the wheels 9 are journaled to the said standards 8. The bars 10 are pivotally and adjustably secured to the end portions of the arch member 4 and the plow standards 11 are attached to the bars 10. Each standard 11 is provided with a plow point or shovel 12. The forward ends of the handles 13 are attached to the sides of the arch member 3 and the U-shaped iron 14 connects the intermediate portions of the said handles 13 together and is connected with the intermediate portion of the arch member 4 by the bolt 6.

From the foregoing description it is obvious that two or more plow points or shovels 12 may be used in plowing or cultivating as desired; also that the bars 10 may be adjusted laterally and pitched at any desired angle to the line of draft. The same is also the case with the ground wheels 9. By loosening the nut 15 upon the stem of the hook 5 the forward portion of the beam 1 may be moved laterally over the intermediate portion of the arch member 3 and secured at any desired points thereon. During such movement of the beam the swing of the beam occurs upon the pivot bolt 6. Thus it is possible to so pitch the beam that the implement may be used as a straddle row cultivator and at the same time a draft animal will be upon one or the other side of the row.

Having described my invention what I claim as new and desire to secure Letters-Patent is:—

1. A plow comprising a beam, an arch member pivotally connected to the rear portion of the beam, an arch member adjustably connected to an intermediate portion of the beam, ground wheels supporting the last said arch member, plow standards carried by the first said arch member and plow handles connected with the arch members.

2. A plow comprising a beam, an arch member pivotally connected with the rear portion thereof, an arch member adjustably connected with the intermediate portion thereof, irons connecting the vertical sides of the arch members together, ground wheels supporting the last said arch member, plow standards carried by the first said arch member and handles connected with the arch members.

3. A plow comprising a beam, an arch member pivotally connected with the rear portion thereof, an arch member adjustably connected with the intermediate portion thereof, said arch members having horizontally disposed end portions, ground wheels adjustably connected with the end portions of the last said arch member, plow bars adjustably connected with the horizontal portions of the first said arch member and handles connected with said arch members.

In testimony that I claim the foregoing as my own, I have hereto affixed my signature in the presence of two witnesses.

WILLOUGHBY D. DOZIER.

Witnesses:
W. H. JENNINGS,
J. C. SPENCE.